US012770401B2

(12) United States Patent
Park

(10) Patent No.: US 12,770,401 B2
(45) Date of Patent: Oct. 20, 2026

(54) METHOD FOR ESTIMATING A CROWD COUNTING, A METHOD FOR TRAINING A MODEL FOR ESTIMATION OF THE CROWD COUNTING, AND AN ELECTRONIC DEVICE FOR PERFORMING THE SAME

(71) Applicant: NOTA, INC., Daejeon (KR)

(72) Inventor: Hancheol Park, Daejeon (KR)

(73) Assignee: NOTA, INC, Daejeon (KR)

( * ) Notice: Subject to any disclaimer, the term of this patent is extended or adjusted under 35 U.S.C. 154(b) by 180 days.

(21) Appl. No.: 18/920,490

(22) Filed: Oct. 18, 2024

(65) Prior Publication Data

US 2025/0139974 A1 May 1, 2025

(30) Foreign Application Priority Data

Oct. 27, 2023 (KR) ........................ 10-2023-0145565

(51) Int. Cl.
*G06V 20/52* (2022.01)
*G06T 7/70* (2017.01)
(Continued)

(52) U.S. Cl.
CPC ................ *G06V 20/52* (2022.01); *G06T 7/70* (2017.01); *G06V 10/751* (2022.01); *G06V 40/10* (2022.01);
(Continued)

(58) Field of Classification Search
CPC ...... G06V 20/52; G06V 10/751; G06V 40/10; G06V 10/82; G06V 20/53; G06T 7/70;
(Continued)

(56) References Cited

U.S. PATENT DOCUMENTS 12,651,426 B2 * 6/2026 Cho ....................... G06V 10/25
2019/0147584 A1 5/2019 Onoro-Rubio et al.
(Continued)

FOREIGN PATENT DOCUMENTS

CN 109558862 A 4/2019
KR 10-2226753 B1 3/2021
(Continued)

OTHER PUBLICATIONS

Dai M, Huang Z, Gao J, Shan H, Zhang J. Cross-head Supervision for Crowd Counting with Noisy Annotations. arXiv e-prints. Mar. 2023:arXiv-2303.*
(Continued)

*Primary Examiner* — Xuemei G Chen
(74) *Attorney, Agent, or Firm* — BROADVIEW IP LAW, PC

(57) ABSTRACT

The method of estimating a crowd counting according to an embodiment of the present invention includes receiving a first model for a crowd counting estimation that is trained based on a data set, wherein the data set includes an image and a reference annotation corresponding to a human object in the image and includes a sample that is the reference annotation having an error, receiving a second model for a crowd counting estimation that is trained by correcting a portion of the reference annotation included in the data set during each training epoch, receiving a target image, and generating a first crowd counting predicting the number of crowds present in the target image from the target image through the first model and a second crowd counting predicting the number of crowds present in the target image from the target image through the second model.

11 Claims, 7 Drawing Sheets

(51) Int. Cl.
*G06V 10/75* (2022.01)
*G06V 40/10* (2022.01)

(52) U.S. Cl.
CPC ............... *G06T 2207/20081* (2013.01); *G06T 2207/30196* (2013.01); *G06T 2207/30242* (2013.01)

(58) Field of Classification Search
CPC ........... G06T 2207/20081; G06T 2207/30196; G06T 2207/30242
See application file for complete search history.

(56) References Cited

U.S. PATENT DOCUMENTS

| | | | | |
|---|---|---|---|---|
| 2019/0294949 | A1* | 9/2019 | Harvey | F41A 17/063 |
| 2020/0349395 | A1* | 11/2020 | Nushi | G06F 11/3692 |
| 2020/0387718 | A1 | 12/2020 | Chan et al. | |
| 2021/0065351 | A1* | 3/2021 | Yamaji | G06V 20/53 |
| 2021/0276824 | A1* | 9/2021 | Kitano | B66B 5/0012 |
| 2023/0031738 | A1* | 2/2023 | Zheng | G06F 40/129 |
| 2023/0222781 | A1* | 7/2023 | Kim | G06V 10/806 382/156 |
| 2023/0267742 | A1* | 8/2023 | Chembakassery Rajendran | G06F 18/27 382/103 |
| 2024/0153275 | A1* | 5/2024 | Jagadeesan | G06V 20/53 |
| 2024/0338946 | A1* | 10/2024 | Khan | G06V 10/26 |

FOREIGN PATENT DOCUMENTS

| | | | |
|---|---|---|---|
| KR | 10-2022-0086301 | A | 6/2022 |
| KR | 10-2022-0155700 | A | 11/2022 |
| KR | 10-2594435 | B1 | 10/2023 |

OTHER PUBLICATIONS

M. A. Khan, H. Menouar and R. Hamila, "Crowd Density Estimation using Imperfect Labels," 2023 IEEE International Conference on Consumer Electronics (ICCE), Las Vegas, NV, USA, 2023, pp. 1-6, doi: 10.1109/ICCE56470.2023.10043547.*

Han B, Yao Q, Yu X, Niu G, Xu M, Hu W, Tsang IW, Sugiyama M. Co-teaching: robust training of deep neural networks with extremely noisy labels. InProceedings of the 32nd International Conference on Neural Information Processing Systems Dec. 3, 2018 (pp. 8536-8546).*

Wan, Jia et al. (2019) "Adaptive Density Map Generation for Crowd Counting," IEEE/CVF International Conference on Computer Vision; doi: 10.1109/ICCV.2019.00122.

Notice of Allowance for KR 10-2023-0145565 by Korean Intellectual Property Office dated Dec. 20, 2024.

* cited by examiner

METHOD FOR ESTIMATING A CROWD COUNTING, A METHOD FOR TRAINING A MODEL FOR ESTIMATION OF THE CROWD COUNTING, AND AN ELECTRONIC DEVICE FOR PERFORMING THE SAME

CROSS-REFERENCE TO RELATED APPLICATION

This application claims priority to and the benefit of Korean Patent Application No. 10-2023-0145565, filed on Oct. 27, 2023, the disclosure of which is incorporated herein by reference in its entirety.

BACKGROUND

1. Field of the Invention

The present invention relates to crowd counting estimation or crowd density estimation, and more specifically, to a method of estimating a crowd counting using an artificial intelligence model, a method of training an artificial intelligence model for a crowd counting estimation, and/or a device for performing the same.

2. Discussion of Related Art

As the culture of pursuing quality of life spreads, performances, sports, festivals, or events that attract large crowds are becoming more common. When large crowds are concentrated, the likelihood of a stampede-related accident increases dramatically. Meanwhile, as artificial intelligence technology develops, artificial intelligence technology is being used in various industrial fields, and technology for preventing accidents caused by large crowds by predicting the number of people included in large crowds using artificial intelligence technology is being focused on.

Conventionally, the number of crowds was predicted from images or videos (hereinafter, referred to as crowd images) in which large crowds appear using a traditional artificial intelligence model that recognizes objects in the form of a bounding box. However, since crowd images have the characteristics that parts of the bodies of the crowd appearing in the crowd images are frequently obscured, there was a limitation in that a significant error occurred in predicting the number of people present in a crowd image by recognizing the object in the form of a bounding box corresponding to the entire body of the object.

Accordingly, instead of a method of recognizing the entire body of a crowd, a technology for estimating locations of pixels corresponding to a partial area (e.g., head area) of a human object has been developed. However, in order to build a data set for training an artificial intelligence model to estimate the locations of pixels, annotations corresponding to some areas of human objects should be manually assigned to crowd images. This required a high degree of concentration and fatigue of the annotator, and inevitably led to the problem of significant annotation errors in the data set. For example, referring to FIG. 1, according to the conventional method, a first error, which occurs in the form of an annotation being omitted even when the annotation should be assigned (see 1 in FIG. 1), and a second error, which occurs in the form of an annotation being assigned to an incorrect location instead of being assigned to the locations where they should be assigned (see 2 in FIG. 1), have occurred frequently. Moreover, the artificial intelligence model for estimating the crowd counting trained based on the data set with annotation errors present a fatal problem in that it cannot accurately predict the crowd counting.

Therefore, there is a need for technology development and research on a method of estimating a crowd counting, a method of training a model for a crowd counting estimation, and/or a device for performing the same in order to predict the crowd counting more precisely.

SUMMARY OF THE INVENTION

The present invention is directed to providing a method of estimating a crowd counting, a method of training a model for a crowd counting estimation, and/or a device for performing the same in order to predict the crowd counting precisely.

The present invention is also directed to providing a method of estimating a crowd counting, a method of training a model for a crowd counting estimation, and/or a device for performing the same in order to prevent accidents by precisely predicting the crowd counting.

Objects of the present invention are not limited to the above-described objects and other objects that are not described may be clearly understood by those skilled in the art from this specification and the accompanying drawings.

According to an aspect of the present invention, there is provided a method of estimating a crowd counting, which includes receiving a first model for a crowd counting estimation that is trained based on a data set, wherein the data set includes an image and a reference annotation corresponding to a human object in the image and includes a sample that is the reference annotation having an error, receiving a second model for a crowd counting estimation that is trained by correcting a portion of the reference annotation included in the data set during each training epoch, receiving a target image, generating a first crowd counting predicting the number of crowds present in the target image from the target image through the first model and a second crowd counting predicting the number of crowds present in the target image from the target image through the second model, and outputting crowd counting information in the form of a range on the basis of the first crowd counting and the second crowd counting.

According to another aspect of the present invention, there is provided an electronic device which includes a transmission and reception unit configured to receive a target image, and a processor configured to estimate a crowd counting on the basis of the target image, wherein the processor is configured to receive a first model for a crowd counting estimation that is trained based on a data set, wherein the data set includes an image and a reference annotation corresponding to a human object in the image and includes a sample that is the reference annotation of which at least a portion has an error, receive a second model for a crowd counting estimation that is trained by correcting a portion of the reference annotation included in the data set during each training epoch, generate a first crowd counting predicting the number of crowds present in the target image from the target image through the first model, generate a second crowd counting predicting the number of crowds present in the target image from the target image through the second model, and output crowd counting information in a form of a range on the basis of the first crowd counting and the second crowd counting.

Solutions of the present invention are not limited to the above-described solutions and other solutions that are not described may be clearly understood by those skilled in the art from this specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
FIG. 1 is a diagram for describing an aspect of an annotation error according to the prior art.

The above-described objects, features and, advantages of the present invention will be clearly understood through the following detailed description taken in conjunction with the accompanying drawings. However, while the present invention can be modified in various ways and take on various alternative forms, specific embodiments thereof are shown in the drawings and described in detail below as examples.

Like reference numerals refer to like elements in principle throughout the specification. Further, elements with the same function within the scope of the same idea shown in the drawings of each embodiment will be described using the same reference numerals, and the descriptions thereof will not be repeated.

When it is determined that detailed descriptions of related well-known functions or configurations may unnecessarily obscure the gist of the present invention, detailed descriptions thereof will be omitted. Further, the ordinal numbers (for example, first, second, etc.) used in description of the specification are used only to distinguish one element from another element.

Further, the term "module," "unit," "part," or "portion" of an element used herein is assigned or incorporated for convenience of specification description, and the term itself does not have a distinct meaning or role.

As used herein, the singular forms "a" and "an" are intended to include the plural forms as well, unless the context clearly indicates otherwise.

It will be further understood that the terms "comprise," "comprising," "include," and/or "including" used herein specify the presence of stated features or elements, but do not preclude the presence or addition of one or more other features or elements.

Sizes of elements in the drawings may be exaggerated for convenience of explanation. In other words, since sizes and thicknesses of elements in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

In the following embodiments, when a first element is referred to as being "connected" to a second element, it includes not only a case where the two elements are "directly connected," but also a case where the two elements are "indirectly connected" with a third element interposed therebetween. For example, in this specification, when a first element is referred to as being "electrically connected" to a second element, it includes not only a case where the two elements are "directly electrically connected," but also a case where the two elements are "indirectly electrically connected" with a third element interposed therebetween.

A method of estimating a crowd counting according to an embodiment of the present invention may include receiving a first model for a crowd counting estimation that is trained based on a data set, wherein the data set includes an image and a reference annotation corresponding to a human object in the image and includes a sample that is the reference annotation having an error, receiving a second model for a crowd counting estimation that is trained by correcting a portion of the reference annotation included in the data set during each training epoch, receiving a target image, generating a first crowd counting predicting a number of crowds present in the target image from the target image through the first model and a second crowd counting predicting a number of crowds present in the target image from the target image through the second model, and outputting crowd counting information in a form of a range on the basis of the first crowd counting and the second crowd counting, wherein the portion of the reference annotation to be corrected is selected based on a learning difficulty which is calculated based on a loss value for each first pixel between the reference annotation which is obtained for each training epoch in a training process for the first model and a first predictive annotation which is predicted though the first model.

According to one embodiment of the present invention, the first model may be configured to predict, from the data set, the first predictive annotation related to the reference annotation included in the data set, wherein the first model may be trained based on the loss value for each first pixel between the reference annotation of the data set and the first predictive annotation.

According to one embodiment of the present invention, the second model may be configured to predict, from the data set, a second predictive annotation related to the reference annotation, wherein the second model may be trained based on a loss value for each second pixel between the reference annotation of which the portion is corrected in each training epoch and the second predictive annotation, and the reference annotation of which the portion is corrected may be obtained by correcting a pixel value of the reference annotation that corresponds to the first pixel, on the basis of a pixel value of the reference annotation that corresponds to the first pixel and a pixel value of the second predictive annotation predicted in each training epoch that corresponds to the first pixel, and a correction variable.

According to one embodiment of the present invention, the correction variable may include a first variable applied to the pixel value of the reference annotation that corresponds to the first pixel and a second variable applied to the pixel value of the second predictive annotation that corresponds to the first pixel, and the second model may be trained using a corrected data set which is obtained by: calculating a first adjusted pixel value based on pixel value corresponding to the first pixel of the reference annotation and the first variable, calculating a second adjusted pixel value based on pixel value corresponding to the first pixel of the second predictive annotation and the second variable, and correcting pixel value of the reference annotation corresponding to the first pixel of the dataset based on the first adjusted pixel value and the second adjusted pixel value.

According to one embodiment of the present invention, the correction variable may include a first variable applied to the pixel value of the reference annotation that corresponds to the first pixel and a second variable applied to the pixel value of the second predictive annotation that corresponds to the first pixel, and as the training epoch of the second model progresses, a value of the second variable may increase and a value of the first variable may decrease.

According to one embodiment of the present invention, the correction of the portion of the reference annotation may be performed on a first pixel, which is selected from among a plurality of pixels included in the reference annotation and whose the learning difficulty falls within a preset ranking variable.

According to one embodiment of the present invention, the reference annotation of which the portion is corrected may be obtained by maintaining the pixel value of the reference annotation that corresponds to each of second pixels other than first pixels selected from among the plurality of pixels included in the reference annotation based on the learning difficulty.

According to one embodiment of the present invention, the generating of the first crowd counting and the second crowd counting may further include receiving a first output annotation from the target image through the first model and calculating the first crowd counting predicting the number of crowds present in the target image on the basis of the first output annotation, and receiving a second output annotation from the target image through the second model and calculating the second crowd counting predicting the number of crowds present in the target image on the basis of the second output annotation.

According to one embodiment of the present invention, the reference annotation may include a reference point map including coordinates corresponding to the human object in the image or a reference heat map label generated by applying a Gaussian kernel to the reference point map.

A non-transitory computer-readable recording medium on which a computer program executed by a computer is recorded according to an embodiment of the present invention may comprise receiving a first model for a crowd counting estimation that is trained based on a data set, wherein the data set includes an image and a reference annotation corresponding to a human object in the image and includes a sample that is the reference annotation having an error, receiving a second model for a crowd counting estimation that is trained by correcting a portion of the reference annotation included in the data set during each training epoch, receiving a target image, generating a first crowd counting predicting a number of crowds present in the target image from the target image through the first model and a second crowd counting predicting a number of crowds present in the target image from the target image through the second model, and outputting crowd counting information in a form of a range on the basis of the first crowd counting and the second crowd counting, and wherein the portion of the reference annotation to be corrected is selected based on a learning difficulty which is calculated based on a loss value for each first pixel between the reference annotation which is obtained for each training epoch in a training process for the first model and a first predictive annotation which is predicted though the first model.

An electronic device according to an embodiment of the present invention may include a transmission and reception unit configured to receive a target image, and a processor configured to estimate a crowd counting on the basis of the target image, wherein the processor is configured to: receive a first model for a crowd counting estimation that is trained based on a data set, wherein the data set includes an image and a reference annotation corresponding to a human object in the image and includes a sample that is the reference annotation of which at least a portion has an error, receive a second model for a crowd counting estimation that is trained by correcting the portion of the reference annotation included in the data set during each training epoch, generate a first crowd counting predicting a number of crowds present in the target image from the target image through the first model, generate a second crowd counting predicting a number of crowds present in the target image from the target image through the second model, and output crowd counting information in a form of a range on the basis of the first crowd counting and the second crowd counting, and wherein the portion of the reference annotation to be corrected is selected based on a learning difficulty which is calculated based on a loss value for each first pixel between the reference annotation which is obtained for each training epoch in a training process for the first model and a first predictive annotation which is predicted though the first model.

Hereinafter, a method of training an artificial intelligence model (or a neural network model) for a crowd counting estimation, a method of estimating a crowd counting, and/or a device for performing the same (hereinafter, referred to as an electronic device) according to an embodiment of the present invention will be described in more detail with reference to FIGS. 2 to 9.

Figure 2:
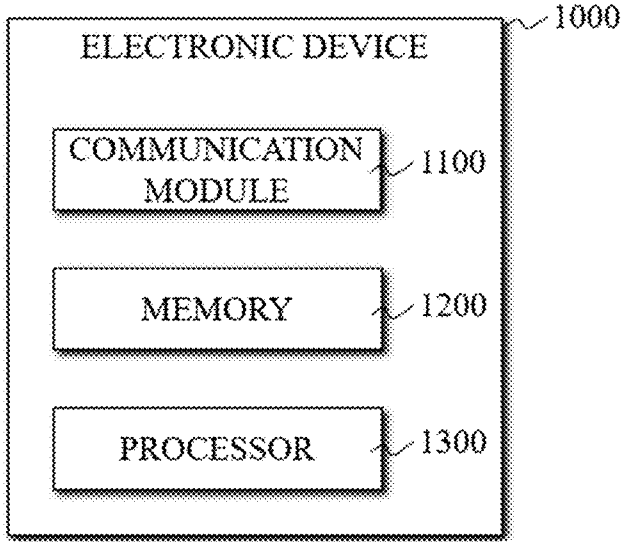
Prior Art FIG. 2
FIG. 2 is a schematic diagram illustrating an electronic device according to an embodiment of the present invention.

FIG. 2 is a schematic diagram illustrating an electronic device according to an embodiment of the present invention.

According to one embodiment, an electronic device 1000 may perform an operation of training an artificial intelligence model (hereinafter, referred to as a crowd counting estimation model) for a crowd counting estimation. Specifically, the electronic device 1000 may perform an operation of training a crowd counting estimation model while correcting a portion of an annotation included in a data set for each training epoch.

According to one embodiment, the electronic device 1000 may perform an operation of calculating crowd counting information related to the number of crowds in an image from an image related to a crowd of an analysis target using a crowd counting estimation model of which the training for the crowd counting estimation is completed.

The electronic device 1000 may be any type of server, personal computer (PC), tablet computer, smartphone, smart watch, personal digital assistant (PDA), and/or a combination thereof. Furthermore, the comprehensive meaning of the electronic device 1000 may include a combination of one or more servers.

Meanwhile, in FIG. 2, a single electronic device 1000 has been described as performing an operation of training a crowd counting estimation model and an operation of estimating a crowd counting using the crowd counting estimation model of which the training is completed. However, this is only for convenience of description, and a device for performing the operation of training a crowd counting estimation model and a device for performing the operation of estimating a crowd counting using the crowd counting estimation model of which the training is completed may be separately configured.

The electronic device 1000 may include a communication module 1100, a memory 1200, and/or a processor 1300.

The communication module 1100 of the electronic device 1000 may communicate with any external device or an external server. For example, the electronic device 1000 may obtain arbitrary data (e.g., structural information of the crowd counting estimation model, operation library, weight information, etc.) for executing the crowd counting estimation model of which the training is completed, through the communication module 1100. For example, the electronic device 1000 may obtain a data set for training the crowd counting estimation model, and/or an image set of an analysis target through the communication module 1100. For example, the electronic device 1000 may transmit an output value for the crowd counting information calculated using the crowd counting estimation model of which the training is completed, to an output unit (e.g., a display, a monitor, etc.) of the electronic device 1000 and/or any external device through the communication module 1100. However, this is only exemplary, and the electronic device 1000 may transmit or receive any appropriate data and/or commands to or from any component through the communication module 1100.

The electronic device 1000 may access a network through the communication module 1100 to transmit or receive various types of data. The communication module 1100 may largely include a wired-type communication module 1100 and a wireless-type communication module 1100. Since the wired-type communication module 1100 and the wireless-type communication module 1100 have their own advantages and disadvantages, in some cases, the wired-type communication module 1100 and the wireless-type communication module 1100 may be provided together as the electronic device 1000. Here, in the case of the wireless-type communication module 1100, a wireless local area network (WLAN) type communication method such as Wi-Fi may be mainly used. Alternatively, in the case of the wireless-type communication module 1100, cellular communication, such as long-term evolution (LTE) or 5G communication methods, may be used. However, a wireless communication protocol is not limited to the above-described example, and any appropriate wireless type of communication method may be used. In the case of the wired-type communication module 1100, a local area network (LAN) or Universal Serial Bus (USB) communication is a representative example, but other methods may be used.

Various types of information may be stored in the memory 1200 of the electronic device 1000. Various types of data may be temporarily or semi-permanently stored in the memory 1200. Examples of the memory 1200 may include a hard disk drive (HDD), a solid state drive (SSD), a flash memory, a read-only memory (ROM), a random access memory (RAM), etc. The memory 1200 may be provided to be embedded in the electronic device 1000 or in a detachable form. Various types of data necessary for the operation of the electronic device 1000, including an operating program (OS) for driving the electronic device 1000 or a program for operating each component of the electronic device 1000, may be stored in the memory 1200.

The processor 1300 may control the overall operation of the electronic device 1000. For example, the processor 1300 may control the overall operation of the electronic device 1000, including an operation P1 of training a crowd counting estimation model (e.g., a first model and/or a second model) which will be described below, and/or an operation P2 of calculating crowd counting information related to the number of crowds included in a target image using the crowd counting estimation model (e.g., the first model and/or the second model) of which the training is completed. Specifically, the processor 1300 may load and execute a program for the overall operation of the electronic device 1000 from the memory 1200. The processor 1300 may be implemented as an application processor (AP), a central processing unit (CPU), a microcontroller unit (MCU), or a similar device depending on hardware, software, or a combination thereof. In this case, the processor 1300 may be provided in the form of an electronic circuit that processes electrical signals and performs a control function in hardware, and may be provided in the form of a program or code that drives a hardware circuit in software.

Figure 3:
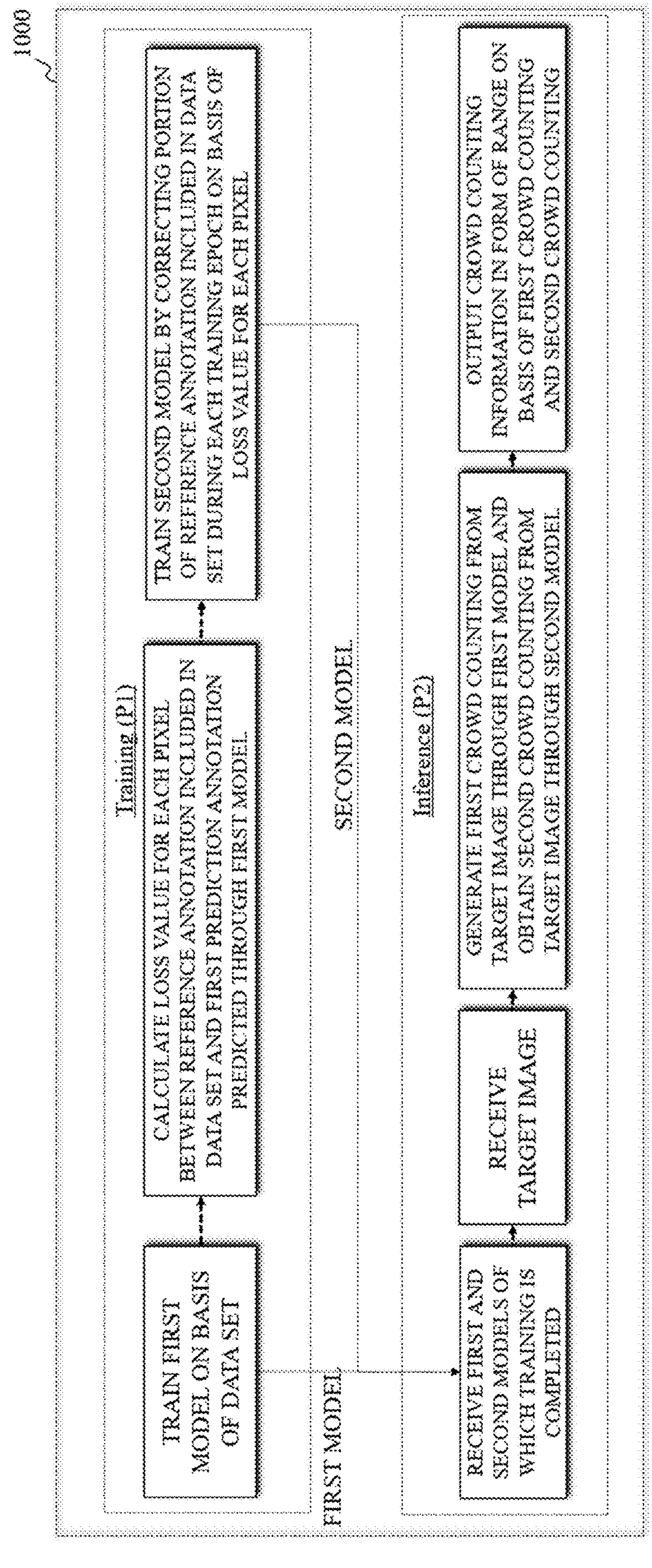
FIG. 3 is a diagram for describing operations performed by an electronic device according to an embodiment of the present invention.

FIG. 3 is a diagram for describing operations performed by an electronic device 1000 according to an embodiment of the present invention.

The electronic device 1000 according to the embodiment of the present invention may perform an operation P1 of training a crowd counting estimation model.

The electronic device 1000 may be implemented to train a first model for a crowd counting estimation on the basis of a data set. The data set may include at least one image and a reference annotation corresponding to a human object in the image. In this case, the data set may include a sample that is the reference annotation having an error. The first model may be configured to predict, from the data set, a first predictive annotation related to the reference annotation included in the data set. In this case, the electronic device 1000 may train the first model by updating a weight (or a parameter) included in the first model on the basis of a loss value for each pixel between the reference annotation of the data set and the first predictive annotation.

The electronic device 1000 may be implemented to train a second model for a crowd counting estimation by correcting a portion of the reference annotation included in the data set on the basis of the loss value for each pixel obtained in the training process for the first model. As described above, the data set may include a sample that is the reference annotation having an error. Therefore, the electronic device 1000 according to the embodiment of the present invention may train the second model for the crowd counting estimation on the basis of the data set in which the portion of the reference annotation is corrected during each training epoch. For example, the electronic device 1000 may train the second model for the crowd counting estimation by correcting the portion of the reference annotation included in the data set online in each training epoch on the basis of the loss value for each pixel.

The portion of the reference annotation to be corrected may be selected based on the loss value for each pixel obtained during the training process for the first model. For example, the electronic device 1000 may be configured to obtain an average value of the loss value for each pixel between the reference annotation and the first predictive annotation obtained for each training epoch of the first model, and select a pixel (hereinafter, referred to as a first pixel) corresponding to the portion of the reference annotation to be corrected from among a plurality of pixels corresponding to the reference annotation included in the data set on the basis of the average value of the loss value for each pixel.

Meanwhile, the second model may be configured to predict a second predictive annotation related to the reference annotation from the data set (e.g., the data set in which a portion of the reference annotation is corrected), and may be trained after a weight included in the second model is updated based on the loss value for each pixel between the reference annotation of which the portion is corrected and the second predictive annotation.

In this case, the electronic device 1000 may be implemented to correct a pixel value of the reference annotation that corresponds to the selected first pixel on the basis of a pixel value of the reference annotation that corresponds to the selected first pixel, a pixel value of the second predictive annotation predicted in each training epoch of the second model that corresponds to the selected first pixel, and/or a correction variable.

The correction variable may include a first variable applied to the pixel value of the reference annotation that corresponds to the first pixel and a second variable applied to the pixel value of the second predictive annotation that corresponds to the first pixel. In this case, the electronic device 1000 may be configured to correct a pixel value of the first pixel of the reference annotation of the data set on the basis of the adjusted pixel value obtained by applying the first variable to the pixel value of the reference annotation that corresponds to the first pixel and the adjusted pixel value obtained by applying the second variable to the pixel value of the second predictive annotation that corresponds to the first pixel. Meanwhile, the electronic device 1000 may be configured not to perform correction on pixels (hereinafter, referred to as second pixels) other than the first pixel selected from among a plurality of pixels included in the reference annotation included in the data set, and to maintain the pixel value of the reference annotation that corresponds to the second pixel.

According to one embodiment of the present invention, as the training epoch of the second model progresses, the electronic device 1000 may be configured to set a value of the second variable applied to the pixel value of the second predictive annotation that corresponds to the first pixel to be increased and a value of the first variable applied to the pixel value of the reference annotation that corresponds to the first pixel to be reduced, and to correct the portion of the reference annotation of the data set.

The training of the crowd counting estimation model including the first model and/or the second model will be described in more detail with reference to FIGS. 5 to 9.

The electronic device 1000 according to the embodiment of the present invention may perform an operation P2 of estimating crowd counting information related to the number of crowds included in an image of an analysis target using the crowd counting estimation model of which the training is completed.

The electronic device 1000 may perform an operation of receiving the crowd counting estimation model including the first model and/or the second model of which the training is completed through the operation P1 of training the crowd counting estimation model described above, through the communication module 1100. The receiving of the crowd counting estimation model may mean that arbitrary data (e.g., structural information of the crowd counting estimation model, operation library, and/or weight information of the crowd counting estimation model) for appropriately executing the crowd counting estimation model (e.g., the first model and/or the second model) is received.

Furthermore, the electronic device 1000 may perform an operation of receiving an image of an analysis target (hereinafter, referred to as a target image) through the communication module 1100. The target image may be any type of image related to a crowd.

The electronic device 1000 may perform an operation of inputting the target image to the crowd counting estimation model of which the training is completed and outputting the crowd counting information related to the number of crowds included in the target image as an output value.

According to one embodiment, the electronic device 1000 may be implemented to obtain the crowd counting information in the form of a range. Specifically, the electronic device 1000 may obtain a first crowd counting obtained by estimating the number of crowds included in the target image from the target image using the first model of which the training is completed. Furthermore, the electronic device 1000 may obtain a second crowd counting obtained by estimating the number of crowds included in the target image from the target image using the second model of which the training is completed. In this case, the electronic device 1000 may be implemented to calculate the crowd counting information in the form of a range on the basis of the first crowd counting and the second crowd counting.

Hereinafter, a method of estimating a crowd counting and/or a method of training a crowd counting estimation model according to an embodiment of the present invention will be described in more detail with reference to FIGS. 4 to 9. Meanwhile, in describing the method of estimating a crowd counting and/or the method of training a crowd counting estimation model, descriptions of some embodiments that overlap with the content previously described with reference to FIGS. 2 and 3 may be omitted. However, this is only for convenience of description and should not be construed for purposes of limitation.

Figure 4:
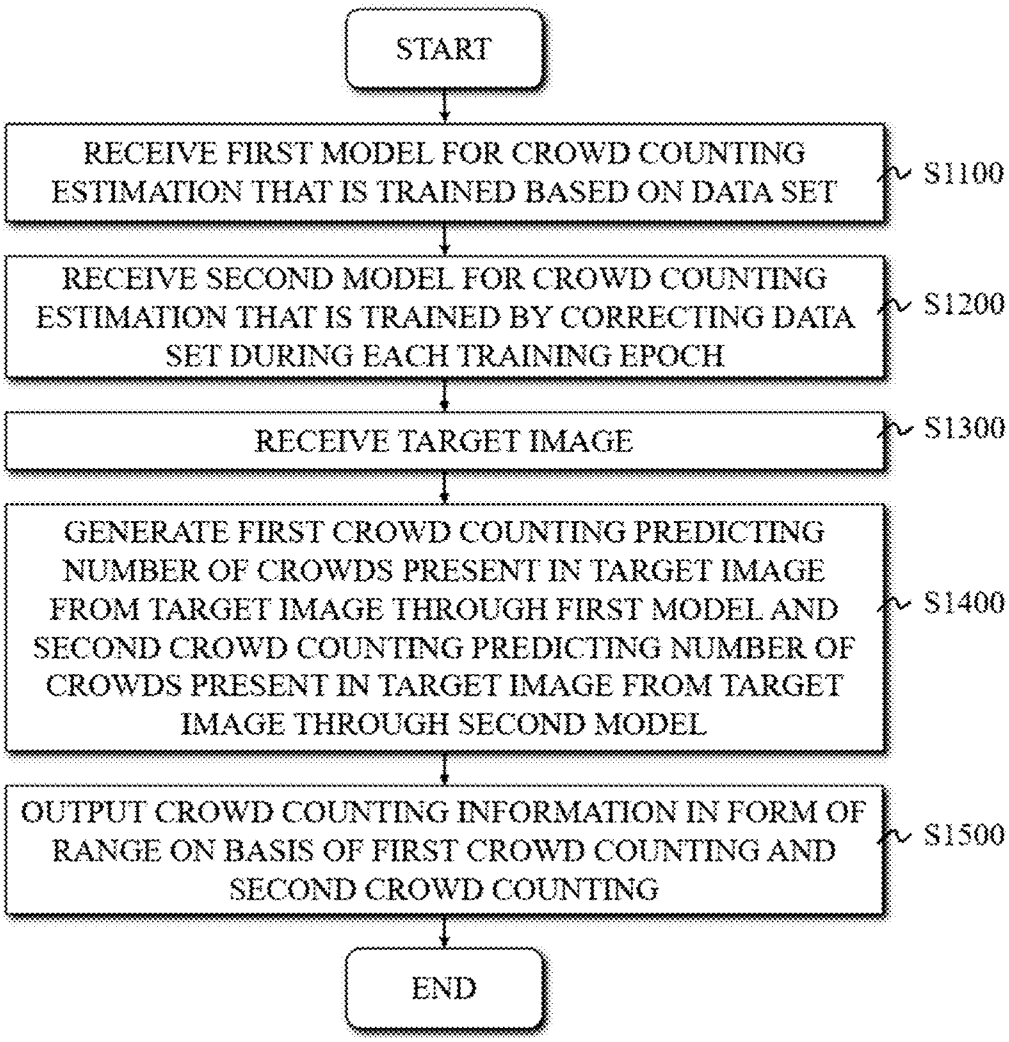
FIG. 4 is a flowchart illustrating a method of estimating a crowd counting according to an embodiment of the present invention.

FIG. 4 is a flowchart illustrating a method of estimating a crowd counting according to an embodiment of the present invention.

The method of estimating a crowd counting according to the embodiment of the present invention may include an operation S1100 of receiving a first model for a crowd counting estimation that is trained based on a data set, an operation S1200 of receiving a second model for a crowd counting estimation that is trained by correcting the data set during each training epoch, an operation S1300 of receiving a target image, an operation S1400 of generating a first crowd counting predicting the number of crowds present in the target image from the target image through the first model and a second crowd counting predicting the number of crowds present in the target image from the target image through the second model, and/or an operation S1500 of outputting crowd counting information in the form of a range on the basis of the first crowd counting and the second crowd counting.

In the operation S1100 of receiving the first model for the crowd counting estimation that is trained based on the data set, the electronic device 1000 may obtain the first model for the crowd counting estimation of which the training is completed. The receiving of the first model may mean that arbitrary data (e.g., structural information of the first model, operation library, and/or weight information of the first model) for appropriately executing the first model of which the training is completed is obtained.

The first model may be trained based on the data set. The data set may include an image, and a reference annotation corresponding to a human object in the image.

Figure 5:
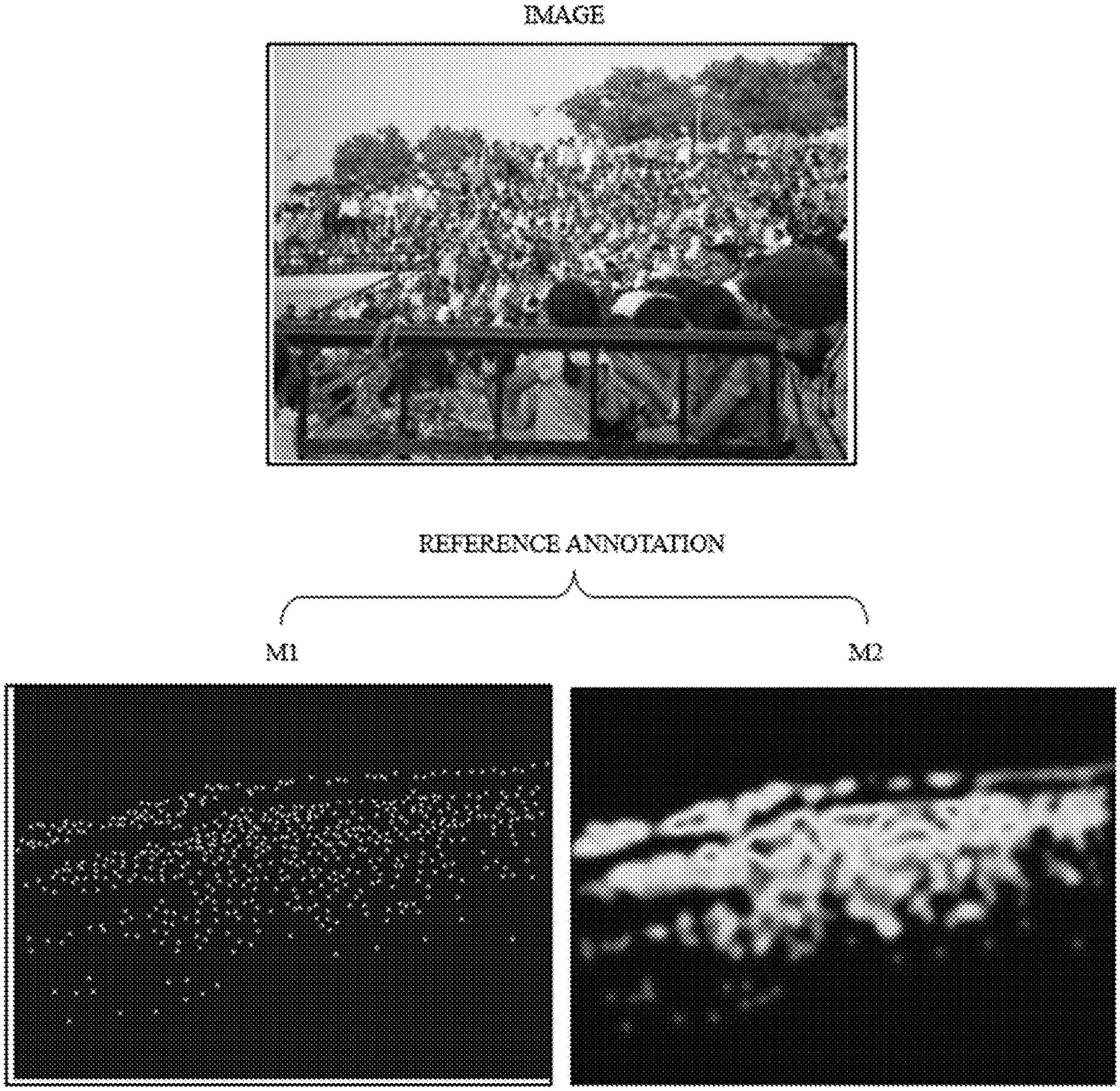
FIG. 5 is a set of diagrams for describing an image included in a data set and an aspect of reference annotations corresponding to human objects in the image according to an embodiment of the present invention.

FIG. 5 is a set of diagrams for describing an image included in a data set and an aspect of reference annotations corresponding to human objects in the image according to an embodiment of the present invention.

The reference annotation may include a point map M1 including coordinates corresponding to the human object of the image in the image, and/or a heat map label M2 (which may also referred to as a heat map or a density map) generated by applying a Gaussian Kernel to the point map M1. Meanwhile, as described above, the data set may include a sample that is the reference annotation having an error. Due to the characteristics of crowd-related images, since there is a lot of occlusion between human objects in the image and annotations is assigned to the images manually, which requires a high degree of concentration and fatigue, there may be errors in the reference annotation. For example, there may be an error in which an annotation should be included but is omitted, or an annotation is incorrectly assigned to a location other than the head area (e.g., the center of the head) of the human object. Meanwhile, the reference annotation may be related to two-dimensional coordinates corresponding to the center of the head of the human object.

Figure 6:
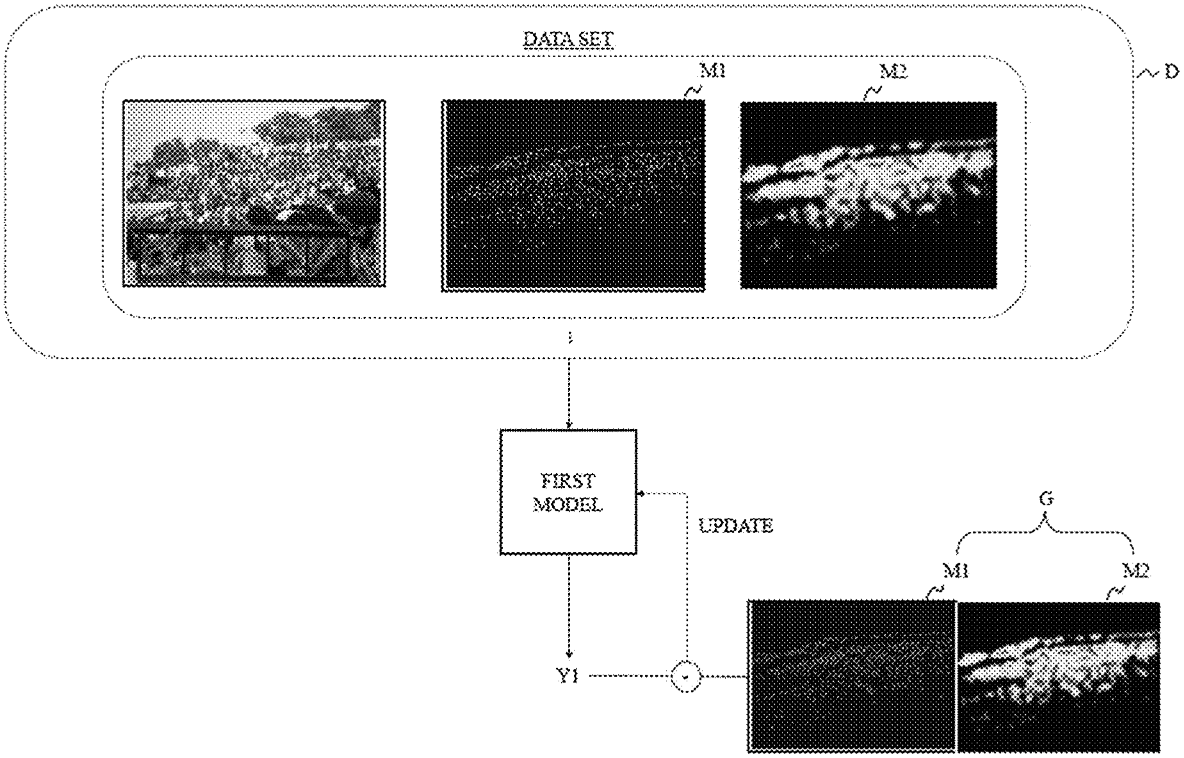
FIG. 6 is a diagram for describing an aspect of training a first model for a crowd counting estimation on the basis of a data set according to an embodiment of the present invention.

FIG. 6 is a diagram for describing an aspect of training a first model for a crowd counting estimation on the basis of a data set according to an embodiment of the present invention.

The first model may be configured to predict a first predictive annotation Y1 related to a reference annotation G included in a data set D, from the data set D. For example, the first predictive annotation Y1 may be in the form of a point map or a heat map. In this case, the electronic device 1000 may train the first model by updating a weight (or a parameter) included in the first model on the basis of a loss value for each pixel between the reference annotation G of the data set D and the first predictive annotation Y1. Specifically, the electronic device 1000 may obtain the loss value for each pixel calculated based on a difference between a pixel included in the reference annotation G of the data set D and a corresponding pixel included in the first predictive annotation Y1, and may train the first model by updating the weight included in the first model in a way that minimizes the loss value for each pixel, on the basis of the obtained loss value for each pixel.

In the operation S1200 of receiving the second model for the crowd counting estimation that is trained by correcting the data set during each training epoch, the electronic device 1000 may obtain the second model for the crowd counting estimation of which the training is completed, through the communication module 1100. The receiving of the second model may mean that arbitrary data (e.g., structural information of the second model, operation library, and/or weight information of the second model) for appropriately executing the second model of which the training is completed is obtained.

The second model may be trained based on the data set in which a portion of the reference annotation included in the data set is corrected. As described above, the data set used for training the first model may include a sample in which an error is included in the reference annotation. The electronic device 1000 according to the embodiment of the present invention may train a crowd counting estimation model (e.g., the second model) while correcting a portion of the reference annotation corresponding to an error included in the data set. Specifically, the electronic device 1000 may train the second model for the crowd counting estimation while correcting the portion of the reference annotation included in the data set for each training epoch online.

Hereinafter, an aspect of training a second model according to an embodiment of the present invention will be described in more detail with reference to FIGS. 7 and 8.

Figure 7:
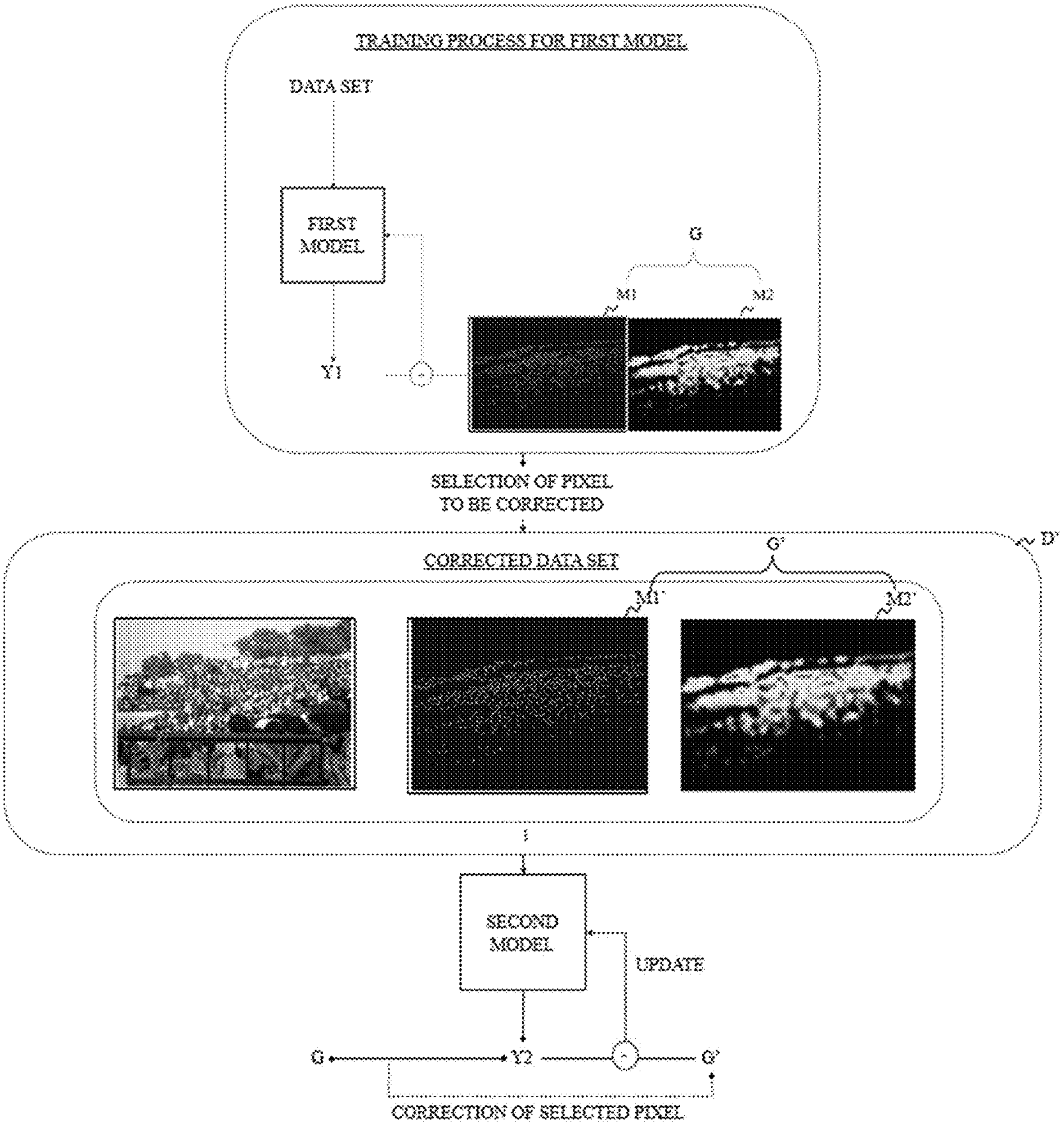
FIG. 7 is a diagram for describing an aspect of training a second model for a crowd counting estimation on the basis of a data set in which a portion of a reference annotation of the data set is corrected according to an embodiment of the present invention.
Figure 8:
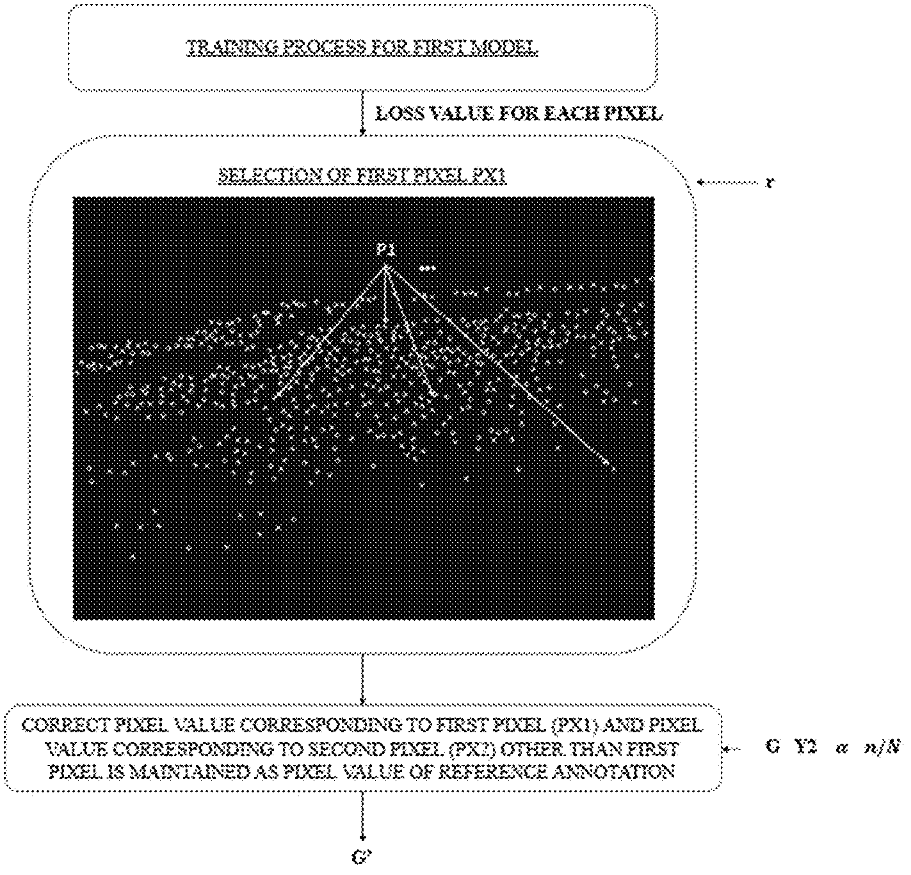
FIG. 8 is a diagram for describing an aspect of selecting a portion of a reference annotation and correcting the selected portion of the reference annotation according to an embodiment of the present invention.

FIG. 7 is a diagram for describing an aspect of training a second model for a crowd counting estimation on the basis of a data set in which a portion of a reference annotation of the data set is corrected according to an embodiment of the present invention. FIG. 8 is a diagram for describing an aspect of selecting a portion of a reference annotation and correcting the selected portion of the reference annotation according to an embodiment of the present invention.

The electronic device 1000 according to the embodiment of the present invention may be configured to select a portion of a reference annotation to be corrected included in a data set on the basis of a loss value for each pixel obtained in the training process for the first model. For example, the electronic device 1000 may be configured to obtain the learning difficulty for each pixel, which is defined as an average value of the loss value for each pixel obtained in the training process for the first model, and select a pixel whose learning difficulty falls within a preset ranking variable r (see FIG. 8), which is selected from among the plurality of pixels corresponding to the reference annotation of the data set, as the first pixel PX1 on which correction is to be performed. A pixel with a higher learning difficulty, that is, a pixel with a higher average loss value for each pixel, may mean that it is relatively difficult to predict the pixel during the training process for the first model, which means that the possibility that an error may be present in the annotation for the corresponding pixel is relatively high. Therefore, according to an example of the present invention, a pixel whose learning difficulty falls within a preset ranking variable, that is, a pixel with relatively high learning difficulty may be selected as the first pixel PX1 that requires correction.

The second model may be configured to predict a second predictive annotation Y2 related to the reference annotation from a data set D' in which the portion of the reference annotation (i.e., the first pixel) is corrected for each training epoch. The corrected data set D' may include a corrected reference annotation G' including a point map M1' in which a pixel value corresponding to the first pixel is corrected from the point map M1 included in the reference annotation Q and/or a heat map M2' in which a pixel value corresponding to the first pixel is corrected from the heat map M2 included in the reference annotation G. In this case, the electronic device 1000 may train the second model by updating a weight included in the second model on the basis of a loss value for each pixel between the corrected reference annotation G' and the second predictive annotation Y2. For example, the electronic device 1000 may train the second model by updating the weight included in the second model in a way that minimizes the loss value for each pixel between the corrected reference annotation G' and the second predictive annotation Y2.

The electronic device 1000 according to the embodiment of the present invention may be configured to correct a pixel value of the reference annotation G that corresponds to the first pixel on the basis of a pixel value of the reference annotation G that corresponds to the selected first pixel, a pixel value of the second predictive annotation Y2 predicted for each training epoch of the second model that corresponds to the first pixel, and/or a correction variable.

The correction variable may include a first variable applied to the pixel value of the reference annotation G that corresponds to the first pixel PX1, and a second variable applied to the pixel value of the second predictive annotation Y2 that corresponds to the first pixel PX1. In this case, the electronic device 1000 may be configured to correct a pixel value of the first pixel PX1 of the reference annotation of the data set G on the basis of the adjusted pixel value obtained by applying the first variable to the pixel value of the reference annotation G that corresponds to the first pixel PX1 and the adjusted pixel value obtained by applying the second variable to the pixel value of the second predictive annotation Y2 that corresponds to the first pixel PX1. Specifically, the electronic device 1000 may calculate a first adjusted pixel value based on pixel value corresponding to the first pixel of the reference annotation G and the first variable, and a second adjusted pixel value based on pixel value corresponding to the first pixel of the second predictive annotation Y2 and the second variable. And the electronic device 1000 may correct pixel value of the reference annotation G corresponding to the first pixel PX1 of the dataset based on the first adjusted pixel value and the second adjusted pixel value. And the electronic device 1000 may train the second model based on the corrected pixel value of the reference annotation G.

Meanwhile, the electronic device 1000 may be configured not to perform correction on pixels (i.e., a second pixel PX2) other than pixels corresponding to the reference annotation whose learning difficulty does not fall within the preset ranking variable r (see FIG. 8), that is, the first pixel PX1, selected from among a plurality of pixels included in the reference annotation, and to maintain the pixel value of the reference annotation G that corresponds to the second pixel PX2.

According to one embodiment of the present invention, as the training epoch of the second model progresses, the electronic device 1000 may be configured to set a value of the second variable applied to the pixel value of the second predictive annotation Y2 that corresponds to the first pixel to be increased and/or a value of the first variable applied to the pixel value of the reference annotation G that corresponds to the first pixel to be reduced, and to correct the portion of the reference annotation of the data set. For example, the electronic device 1000 may be implemented to correct the pixel value of the reference annotation of the data set that corresponds to the first pixel PX1 using Equations below. For example, for the second pixel PX2, the electronic device 1000 may be configured to maintain the pixel value of the reference annotation G that corresponds to the second pixel without change, using Equations below.

Equations $$p_{ij} = (1-\alpha) * GT_{ij} + (\alpha) * H_{ij}, \text{ for the first pixel } PX1$$

-continued $$p_{ij} = GT_{ij}, \text{ for the second pixel } PX2$$

$$\alpha = \alpha_0 * n/N$$

$p_{ij}$: a $j^{th}$ pixel value of the corrected reference annotation G' that corresponds to an $i^{th}$ sample of the data set, $GT_{ij}$: a $j^{th}$ pixel value of the reference annotation G that corresponds to an $i^{th}$ sample of the data set, $H_{ij}$: a $j^{th}$ pixel value of the second predictive annotation Y2 that corresponds to the $i^{th}$ sample of the data set, 1-α: the first variable, α: the second variable, N: a total number of training epochs, and n: a current training epoch.

According to this example, for the selected first pixel PX1, as the training epoch of the second model progresses, that is, n increases, a increases, accordingly, the second variable a applied to the pixel value of the second predictive annotation Y2 that corresponds to the first pixel PX1 increases, and the first variable (1-α) applied to the pixel value of the reference annotation G that corresponds to the first pixel PX1 decreases. That is, as the training epoch of the second model progresses, the pixel value corresponding to the first pixel may be corrected by assigning a relatively high weight to the pixel value of the second predictive annotation predicted through the second model.

According to one embodiment of the present invention, as the training epoch of the second model progresses, the prediction accuracy of the second predictive annotation predicted through the second model may increase, and the electronic device 1000 may correct the pixel value of the annotation of the data set that corresponds to the first pixel by applying a relatively high weight to the pixel value of the second predictive annotation with increased prediction accuracy, thereby correcting an error of the reference annotation included in the data set with high reliability. Furthermore, the electronic device 1000 may train the second model using the data set in which the error of the reference annotation included in the data set is corrected with high reliability, and thus the second model of which the training is completed may calculate the crowd counting with high reliability.

Meanwhile, Equation described above is only exemplary, and as the training epoch progresses, the electronic device 1000 according to the embodiment of the present invention may be implemented to set a value of the second variable applied to the second predictive annotation to be increased, and to correct the pixel value of the reference annotation that corresponds to the selected first pixel using any suitable method.

Meanwhile, although not shown, in the training process for the second model, initial values of hyperparameters (e.g., the ranking variable r related to learning difficulty, the correction variable (e.g., a), and N: the total number of training epochs) related to the second model may be tuned. Specifically, the initial values of the hyperparameters related to the second model may be determined in a way that minimizes an average value of the difference between the actual number of crowds in each image included in the data set and the number of crowds predicted through the second model. For example, a hyperparameter set representing a smaller average value may be determined as the initial values of the hyperparameters of the second model on the basis of a first average value for the difference between the actual number of crowds in each image of the data set calculated through the second model having a first hyperparameter set as the initial value, and a second average value for the difference between the actual number of crowds in each image of the data set calculated through the second model having a second hyperparameter set as the initial value. For example, the initial values of the hyperparameters related to the second model may be determined using a grid search technique.

In the operation S1300 of receiving the target image, the electronic device 1000 may obtain the target image through the communication module 1100. The target image may be any type of image related to a crowd.

In the operation S1400 of generating the first crowd counting predicting the number of crowds present in the target image from the target image through the first model and the second crowd counting predicting the number of crowds present in the target image from the target image through the second model, the electronic device 1000 may obtain the first crowd counting predicting the number of crowds present in the target image from the target image through the first model of which the training is completed, which is obtained through operation S1100, and obtain the second crowd counting predicting the number of crowds present in the target image from the target image through the second model of which the training is completed, which is obtained through operation S1200.

Figure 9:
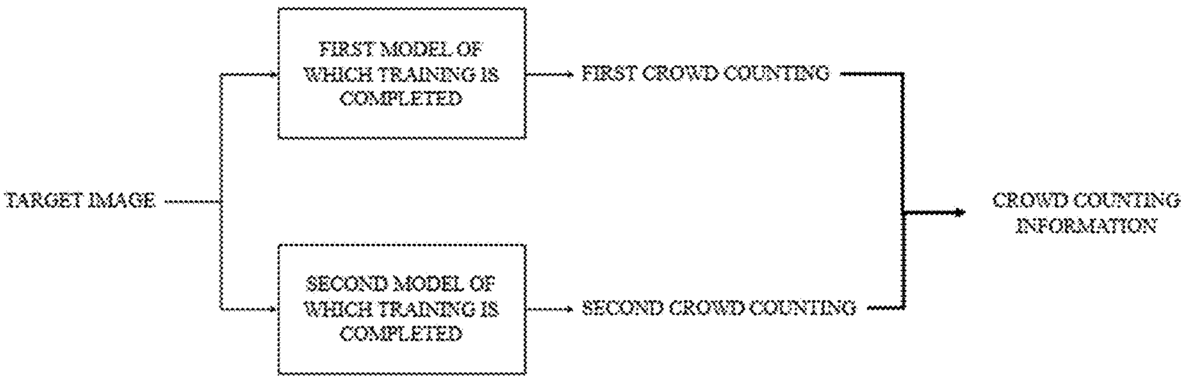
FIG. 9 is a diagram for describing an aspect of calculating crowd counting information in the form of a range according to an embodiment of the present invention.

FIG. 9 is a diagram for describing an aspect of calculating crowd counting information in the form of a range according to an embodiment of the present invention.

The electronic device 1000 may input a target image related to a crowd to an input layer of the first model of which the training is completed. The first model of which the training is completed, and which includes a first weight set fixed as the training is completed, may output a first crowd counting predicting the number of crowds present in the target image through an output layer.

Similarly, the electronic device 1000 may input a target image related to a crowd to an input layer of the second model of which the training is completed. The second model of which the training is completed, and which includes a second weight set fixed as the training is completed, may output a second crowd counting predicting the number of crowds present in the target image through an output layer.

For example, the first model and/or the second model of which the training is completed may be configured to calculate an output annotation in the form of a point map for the coordinates of the target image corresponding to a human object on the target image. In this case, the electronic device 1000 (or the first model or the second model) may receive or calculate the first crowd counting and/or the second crowd counting related to the number of crowds on the basis of the number of coordinates corresponding to the human object included in the output annotation in the form of a point map.

As another example, the first model and/or the second model of which the training is completed may be configured to calculate an output annotation in the form of a heat map (or a density map) including a probability value of an area corresponding to the human object on the target image. In this case, the electronic device 1000 (or the first model or the second model) may receive or calculate the first crowd counting and/or the second crowd counting related to the number of crowds on the basis of the sum of probability values included in the output annotation in the form of a heat map.

In the operation S1500 of outputting the crowd counting information in the form of a range on the basis of the first crowd counting and the second crowd counting, the electronic device 1000 may be implemented to calculate the crowd counting information on the basis of the first crowd counting obtained from the first model of which the training is completed and the second crowd counting obtained from the second model of which the training is completed in operation S1400. Specifically, the electronic device 1000 may be implemented to calculate the crowd counting information in the form of a range on the basis of the first crowd counting and the second crowd counting. For example, the electronic device 1000 may compare the first crowd counting with the second crowd counting, and calculate the crowd counting information by setting the crowd counting with a smaller value among the first crowd counting and the second crowd counting to the bottom of the range and setting the crowd counting with a larger value among the first crowd counting and the second crowd counting to the top of the range.

Meanwhile, in the present invention, the crowd counting information in the form of a range has been described as being calculated based on the output value calculated through each of the first model and the second model. However, this is only exemplary, and the electronic device 1000 according to the embodiment of the present invention may be implemented to provide the crowd counting information in any appropriate form. For example, the electronic device 1000 may be configured to provide the crowd counting information by weighting the first crowd counting obtained through the first model and the second crowd counting obtained through the second model. For example, the electronic device 1000 may be configured to provide at least one of the first crowd counting obtained through the first model and the second crowd counting obtained through the second model as the crowd counting information. For example, the electronic device 1000 may be configured to provide the crowd counting information in the form of a confidence interval on the basis of the first crowd counting obtained through the first model and the second crowd counting obtained through the second model. In this case, the confidence interval may include information related to the range of the crowd counting and/or the reliability of belonging to the range of the crowd counting.

According to the method of estimating a crowd counting, the method of training a model for a crowd counting estimation, and/or the device for performing the same according to the embodiments of the present invention, by providing crowd counting information in the form of a range, safety can be improved by preventing a situation from being determined as not high risk even when it is actually a high risk situation.

According to the method of estimating a crowd counting, the method of training a model for a crowd counting estimation, and/or the device for performing the same according to the embodiments of the present invention, as a training epoch progresses, by applying a relatively high weight to a predicted value with increased prediction accuracy to correct a portion of a reference annotation of a data set, an error in an annotation included in the data set can be corrected with high reliability.

Furthermore, according to the method of estimating a crowd counting, the method of training a model for a crowd counting estimation, and/or the device for performing the same according to an embodiment of the present invention, by training a crowd counting estimation model on the basis of a data set in which an error in an annotation included in a data set is corrected with high reliability, the crowd counting estimation model of which the training is completed can calculate a crowd counting with high accuracy.

According to the method of estimating a crowd counting, the method of training a model for a crowd counting estimation, and/or the device for performing the same according to the embodiments of the present invention, by providing crowd counting information in the form of a range, safety can be increased by preventing a situation from being determined as not high risk even when it is actually a high risk situation.

According to the method of estimating a crowd counting, the method of training a model for a crowd counting estimation, and/or the device for performing the same according to the embodiments of the present invention, as a training epoch progresses, by applying a relatively high weight to a predicted value with increased prediction accuracy to correct a portion of a reference annotation of a data set, an error in an annotation included in the data set can be corrected with high reliability.

According to the method of estimating a crowd counting, the method of training a model for a crowd counting estimation, and/or the device for performing the same according to the embodiments of the present invention, by training a crowd counting estimation model on the basis of a data set in which an error in an annotation included in a data set is corrected with high reliability, the crowd counting estimation model of which the training is completed can calculate a crowd counting with high accuracy.

Effects of the present invention are not limited to the above-described effects and other effects that are not described may be clearly understood by those skilled in the art from the above detailed descriptions.

Features, structures, and effects described in the above-described exemplary embodiments are included in at least one exemplary embodiment of the present invention, but are not necessarily limited to only one exemplary embodiment. Furthermore, features, structures, and effects described in each embodiment can be combined or modified and implemented in other embodiments by one of ordinary skill in the art to which the embodiments belong. Therefore, it should be interpreted that contents related to such combinations and modifications are included in the scope of the present invention.

Further, while the present invention has been particularly described with reference to embodiments, the embodiments are only exemplary embodiments of the present invention and the present invention is not intended to be limited thereto. It will be understood by those skilled in the art that modifications and applications in other forms may be made without departing from the spirit and scope of the present invention. That is, each element specifically shown in the embodiments may be modified and embodied. In addition, it should be understood that differences related to these modifications and applications are within the scope of the present invention as defined in the appended claims.

What is claimed is:

1. A method of estimating a crowd counting using an electronic device, comprising:

receiving a first model for a crowd counting estimation that is trained based on a data set, wherein the data set includes an image and a reference annotation corresponding to a human object in the image and includes a sample that is the reference annotation having an error;

receiving a second model for a crowd counting estimation that is trained by correcting a portion of the reference annotation included in the data set during each training epoch;

receiving a target image;

generating a first crowd counting predicting a number of crowds present in the target image from the target image through the first model and a second crowd counting predicting a number of crowds present in the target image from the target image through the second model; and outputting crowd counting information in a form of a range on the basis of the first crowd counting and the second crowd counting, wherein the portion of the reference annotation to be corrected is selected based on a learning difficulty which is calculated based on a loss value for each first pixel between the reference annotation which is obtained for each training epoch in a training process for the first model and a first predictive annotation which is predicted though the first model.

2. The method of claim 1, wherein the first model is configured to predict, from the data set, the first predictive annotation related to the reference annotation included in the data set, wherein the first model is trained based on the loss value for each first pixel between the reference annotation of the data set and the first predictive annotation.

3. The method of claim 2, wherein the second model is configured to predict, from the data set, a second predictive annotation related to the reference annotation, wherein the second model is trained based on a loss value for each second pixel between the reference annotation of which the portion is corrected in each training epoch and the second predictive annotation, and the reference annotation of which the portion is corrected is obtained by correcting a pixel value of the reference annotation that corresponds to the first pixel, on the basis of a pixel value of the reference annotation that corresponds to the first pixel and a pixel value of the second predictive annotation predicted in each training epoch that corresponds to the first pixel, and a correction variable.

4. The method of claim 3, wherein the correction variable includes a first variable applied to the pixel value of the reference annotation that corresponds to the first pixel and a second variable applied to the pixel value of the second predictive annotation that corresponds to the first pixel, and the second model is trained using a corrected data set which is obtained by: calculating a first adjusted pixel value based on pixel value corresponding to the first pixel of the reference annotation and the first variable, calculating a second adjusted pixel value based on pixel value corresponding to the first pixel of the second predictive annotation and the second variable, and correcting pixel value of the reference annotation corresponding to the first pixel of the dataset based on the first adjusted pixel value and the second adjusted pixel value.

5. The method of claim 3, wherein the correction variable includes a first variable applied to the pixel value of the reference annotation that corresponds to the first pixel and a second variable applied to the pixel value of the second predictive annotation that corresponds to the first pixel, and as the training epoch of the second model progresses, a value of the second variable increases and a value of the first variable decreases.

6. The method of claim 1, wherein the correction of the portion of the reference annotation is performed on a first pixel, which is selected from among a plurality of pixels included in the reference annotation and whose the learning difficulty falls within a preset ranking variable.

7. The method of claim 1, wherein the reference annotation of which the portion is corrected is obtained by maintaining the pixel value of the reference annotation that corresponds to each of second pixels other than first pixels selected from among the plurality of pixels included in the reference annotation based on the learning difficulty.

8. The method of claim 1, wherein the generating of the first crowd counting and the second crowd counting further includes:

receiving a first output annotation from the target image through the first model and calculating the first crowd counting predicting the number of crowds present in the target image on the basis of the first output annotation; and receiving a second output annotation from the target image through the second model and calculating the second crowd counting predicting the number of crowds present in the target image on the basis of the second output annotation.

9. The method of claim 1, wherein the reference annotation includes a reference point map including coordinates corresponding to the human object in the image or a reference heat map label generated by applying a Gaussian kernel to the reference point map.

10. A non-transitory computer-readable recording medium on which a computer program executed by a computer is recorded, the computer program comprising:

receiving a first model for a crowd counting estimation that is trained based on a data set, wherein the data set includes an image and a reference annotation corresponding to a human object in the image and includes a sample that is the reference annotation having an error;

receiving a second model for a crowd counting estimation that is trained by correcting a portion of the reference annotation included in the data set during each training epoch;

receiving a target image;

generating a first crowd counting predicting a number of crowds present in the target image from the target image through the first model and a second crowd counting predicting a number of crowds present in the target image from the target image through the second model; and outputting crowd counting information in a form of a range on the basis of the first crowd counting and the second crowd counting, and wherein the portion of the reference annotation to be corrected is selected based on a learning difficulty which is calculated based on a loss value for each first pixel between the reference annotation which is obtained for each training epoch in a training process for the first model and a first predictive annotation which is predicted though the first model.

11. An electronic device comprising:

a transmission and reception unit configured to receive a target image; and a processor configured to estimate a crowd counting on the basis of the target image, wherein the processor is configured to:

receive a first model for a crowd counting estimation that is trained based on a data set, wherein the data set includes an image and a reference annotation corresponding to a human object in the image and includes a sample that is the reference annotation of which at least a portion has an error;

receive a second model for a crowd counting estimation that is trained by correcting the portion of the reference annotation included in the data set during each training epoch;

generate a first crowd counting predicting a number of crowds present in the target image from the target image through the first model;

generate a second crowd counting predicting a number of crowds present in the target image from the target image through the second model; and output crowd counting information in a form of a range on the basis of the first crowd counting and the second crowd counting, and wherein the portion of the reference annotation to be corrected is selected based on a learning difficulty which is calculated based on a loss value for each first pixel between the reference annotation which is obtained for each training epoch in a training process for the first model and a first predictive annotation which is predicted though the first model.

* * * * *